INVENTOR
JOHN L. MARTIN
ATTORNEY

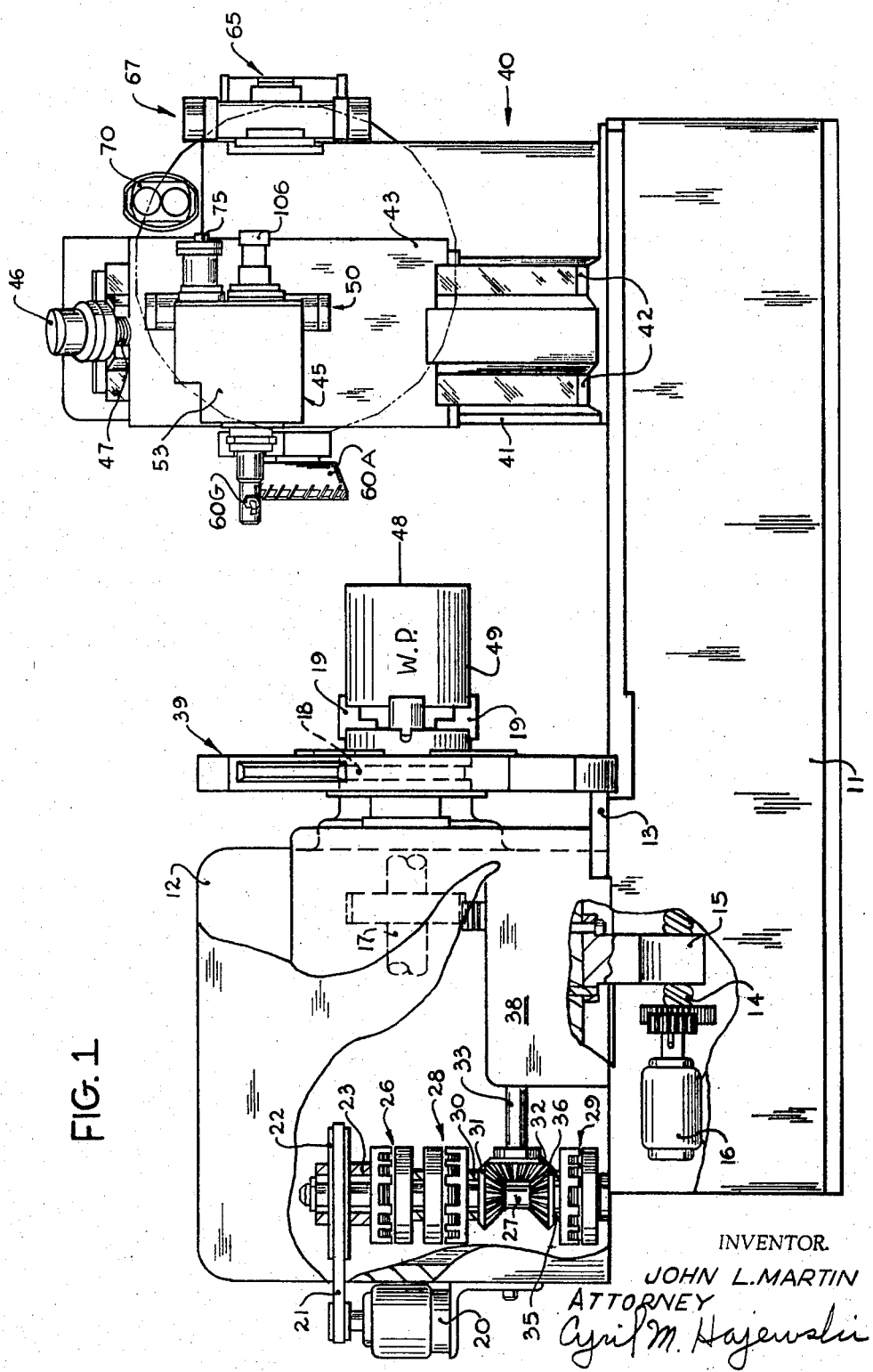

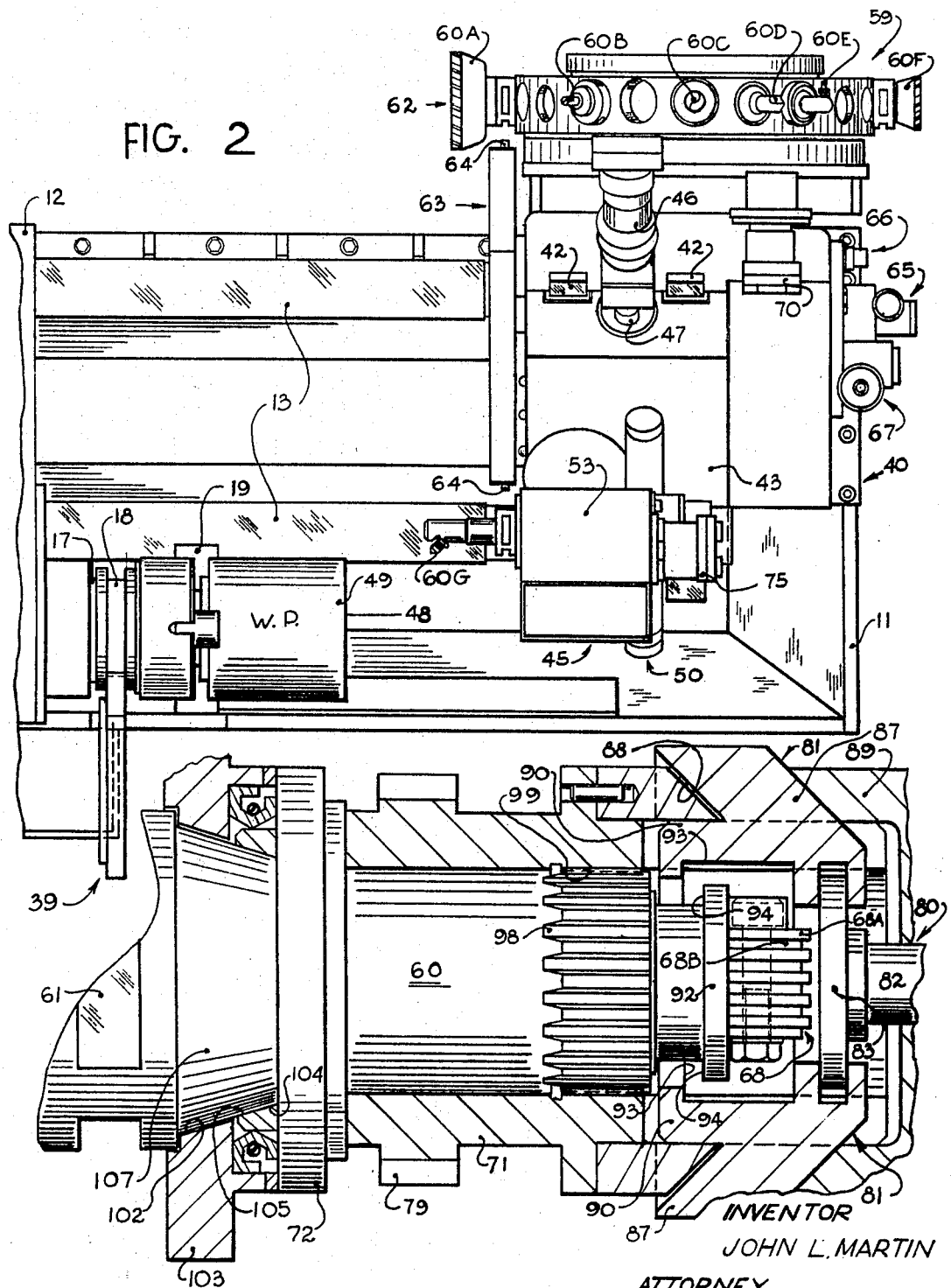

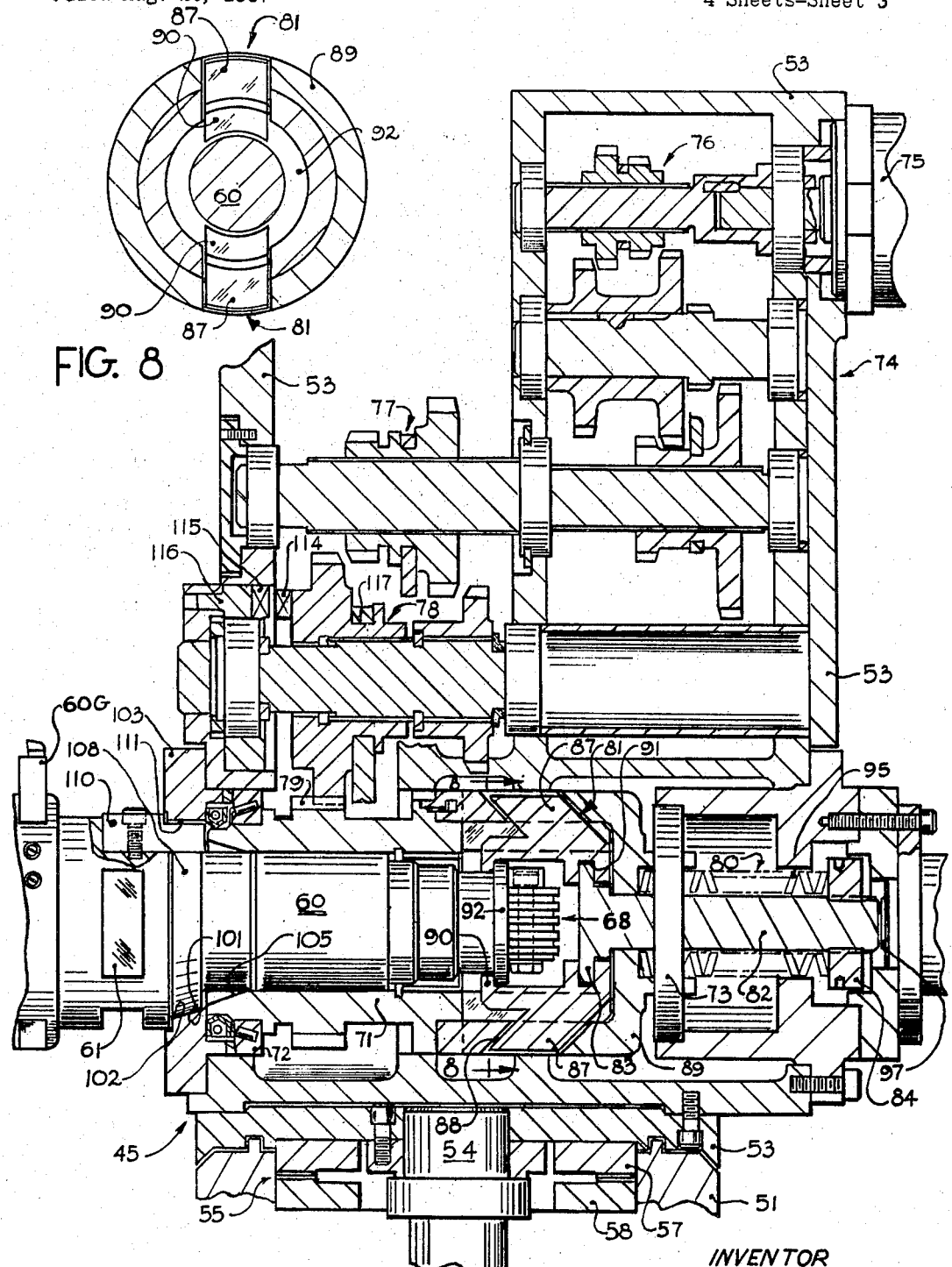

United States Patent Office 3,477,121
Patented Nov. 11, 1969

3,477,121
MACHINING CENTER WITH DUAL FUNCTION TOOL OPERATOR
John L. Martin, Wauwatosa, Wis., assignor to Kearney & Trecker Corporation, West Allis, Wis., a corporation of Wisconsin
Filed Aug. 25, 1967, Ser. No. 663,421
Int. Cl. B23b 7/00
U.S. Cl. 29—568                                    8 Claim

ABSTRACT OF THE DISCLOSURE

A machining center adapted to perform turning operations with a stationary cutting tool, as well as milling and other machining operations requiring a rotating cutter. The tool operator has a spindle that may be fixed against rotation to accommodate a stationary cutting tool or may be rotated to operate a rotory cutting tool, selectively. The tool operator spindle is provided with a drive transmission to rotate a rotary cutting tool while it is engaged in the tool operator spindle. Both the stationary cutting tool and the rotary cutting tool are operably secured in the tool operator spindle by drawing them axially in with a draw-bar mechanism. The rotary cutting tools are provided with tapered surfaces that come into engagement with a tapered surface of the tool operator spindle to fix the rotary cutter in relationship to the spindle. To drivingly engage a rotary cutting tool, the tool operator spindle is provided with complementary splines that match up with splines located on the rear periphery of a rotary cutting tool. The stationary cutting tools are provided with tapered surfaces that come into engagement with a tapered surface of a stationary plate of the tool operator's frame to fix the stationary cutter in relationship to the tool operator's frame. The stationary cutting tools are provided with a key on their forward shank that matches with a keyway in the tool operator housing to lock it in position for a work operation.

BACKGROUND OF THE INVENTION

This invention relates generally to a machining center and more particularly to an improved machine tool with a tool operator having a single dual function spindle which can accommodate either a stationary cutting tool or a rotary cutting tool, selectively.

Before this invention, turning operations were necessarily performed on "turning machines" or lathes that are restricted in their metal removing capabilities by reason of the limitation imposed thereon by the tool operator. In "turning machines," the tool operators are only capable of receiving and using tools of the type which are maintained stationary in the tool operator. With this arrangement, the workpiece must be rotated about its own axis while the tool is maintained stationary. Thus, metal removing operations on a workpiece which require a rotary cutting tool cannot be accomplished on the conventional prior art machines that are capable of performing turning operations. With this condition, it is necessary to transfer a workpiece from one machine tool to another in order to accomplish the desired different metal removing operations.

SUMMARY OF THE INVENTION

According to the invention, there is provided a tool operator for a "machining center" which is capable of utilizing either stationary cutting tools or rotary cutting tools, respectively. To this end, a tool receiving spindle is rotatably journaled in the housing of the tool operator. Rearwardly of the spindle there is provided a tool draw-in bar mechanism which is operable to engage a tool in operative position within the spindle. To effect a rotary drive connection between the spindle and a rotary cutting tool, the rearward end of the rotary tool is provided with splines that are adapted to drivingly engage with complementary splines formed internally within the spindle. On the other hand, a stationary turning tool is not provided with the spline drive arrangement but is provided with a tapered key which is adapted to engage in a keyway formed in a stationary faceplate that is disposed in coaxial relationship to the spindle. With the key on the stationary turning tool engaged in the keyway of the stationary faceplate, the turning tool will be maintained in an operative predetermined angularly orientated position. In this manner, the cutter portion of the stationary turning tool may be related to a workpiece carried by the rotating workpiece spindle.

All rotary cutting tools are provided with tapered shanks providing a frustoconical configuration which comes into engagement with a complementary tapered surface producing a frustoconical surface within the spindle, when the tool is placed in the spindle. The engagement of these two tapered surfaces fix the rotary tool in relationship with the spindle. On the other hand, the stationary cutting tools are provided with tapered shanks that come into engagement with a tapered or complementary frustoconical surface of the tool operator frame and thereby fix the stationary tool in relationship to the frame. The spindle is power driven by a motor through a gear transmission to a drive gear which is in mesh with the spindle. When a tool change is called for, the drive gear is shifted axially to engage a key secured on the drive gear with a keyway located on a stationary collar. This operates to lock the spindle in a predetermined angularly orientated position.

It is a general purpose of this invention to provide a single tool operator for a machining center which is adapted to operably receive stationary turning tools as well as rotary tools.

It is a further object of this invention to provide a tool operator which is operable to drive rotary cutting tools in a metal removing operation, or to hold single point turning tools in a predetermined position, selectively.

It is a further object of the invention to provide a tool operator for a "turning machine" in which there is a single dual function spindle which incorporates means to locate and lock the spindle in a predetermined angularly orientated position.

The foregoing and other objects of this invention, which will become more fully apparent from the following detailed description, may be achieved by the exemplifying apparatus depicted and set forth in the specification in connection with the accompanying drawings in which:

BRIEF DESCRIPTION OF THE DRAWINGS

FIGURE 1 is a fragmentary front view of a turning machine incorporating the features of the present invention;

FIG. 2 is a plan view of a portion of the turning machine illustrated in FIG. 1;

FIG. 3 is a view partly in section and partly in front elevation showing the tool operator of the machine shown in FIG. 1;

FIG. 7 is a fragmentary view of the tool operator spindle provided with a rotary cutting tool, showing the spline connection and binary coding of the tool; and, FIG. 8 is a view in vertical section taken along the plane represented by the line 8—8 in FIG. 3.

DESCRIPTION OF THE PREFERRED EMBODIMENTS

Figures 5, 6:
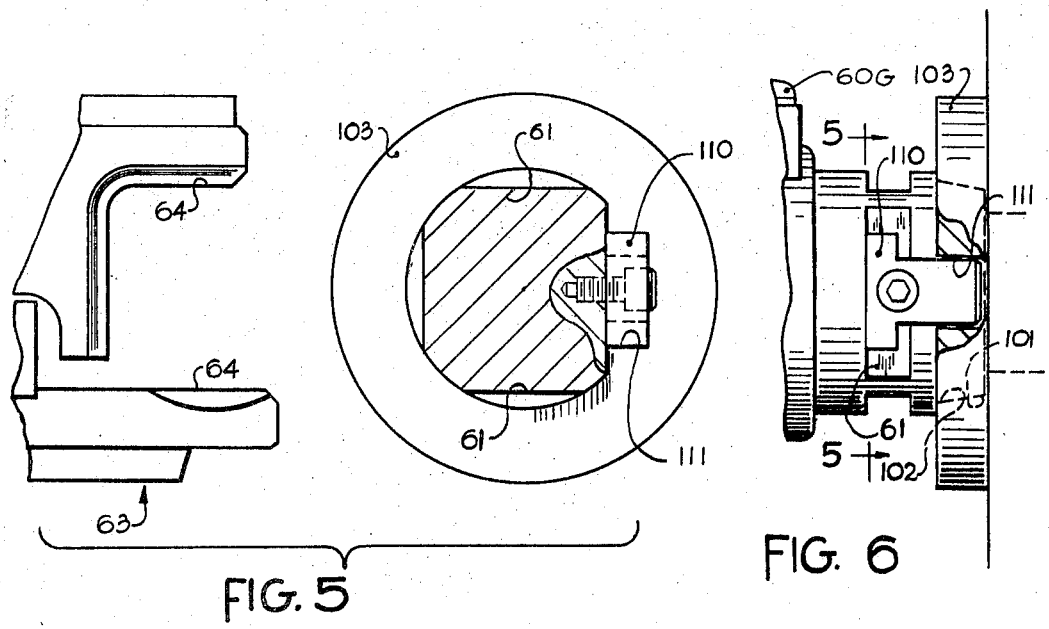
FIG. 5 is a fragmentary view of the front of the tool operator showing a single point cutting tool in the spindle.
FIG. 6 is a fragmentary view of the tool operator depicting the single point cutting tool and showing a key associated with the tool in engagement with a keyway in the stationary faceplate.

Referring now to the drawings, and more specifically to FIGS. 1 and 2 thereof, illustrating a machine tool turning center incorporating the features of the present invention, the machine comprises generally a bed 11 which slidably supports a workpiece spindle headstock 12. To this end, the top surface of the bed 11 is provided with horizontal ways 13 which are engaged by complementary ways (not shown) formed on the bottom of the headstock 12.

Movement of the headstock 12 in either direction is effected by rotating a screw 14 which is in threaded engagement with a recirculating ball bearing nut 15 that is fixed to the undersurface of the headstock 12. The screw is rotatably supported in suitable bearing structures (not shown) provided in the bed 11. Rotation of the screw 14 in either direction is effected by a motor 16 carried with the interior of the hollow bed 11 and connected to rotate the screw 14 for actuating the headstock 12 in its path of travel.

A power driven workpiece spindle 17 is rotatably supported in the headstock 12. Clamping means (not shown) are operatively disposed in the spindle and operate to releasably secure a workpiece adapter ring 18 to the spindle for rotation with the spindle 17. A more detailed description of the clamping means may be had by referring to patent application Ser. No. 641,435 filed May 22, 1967. The adapter ring 18, in turn, is provided with a plurality of radially adjustable clamp jaws 19 which are operative to secure a workpiece WP in coaxial relationship with the spindle 17 in a manner that the workpiece WP will rotate with the spindle 17.

Power for rotating the spindle 17 at selected rate is derived from a unidirectional, two speed motor 20 having an output pulley connected by a belt 21 to rotate a driven pulley 22 secured to a rotatable shaft 23, as shown in FIG. 1. The input pulley shaft 23 is connected to rotate the driving plates of a selectively actuatable multiple disc clutch 26, the driven plates of which are connected in well-known manner to one end of a unidirectional transmission drive shaft 27. The selectively rotatable, input drive shaft 27 is positively connected to rotate the driving plates respectively associated with a forward clutch 28 and a reverse clutch 29. The driven plates of forward clutch 28 are secured to one end of an elongated hub 30 of a bevel gear 31 that meshingly engages a bevel gear 32 secured to one end of a splined transmission input shaft 33. In a similar manner, the driven plates of the reverse clutch 29 are secured to one end of an elongated hub 35 integrally formed with a bevel gear 36 that is likewise connected to intermeshingly engage the bevel gear 32. Whenever it is desired for the workpiece spindle 17 to be positively braked against rotation, the input clutch 26 is deactuated, thereby interrupting the transmission of unidirectional power from the input shaft 23 to the unidirectional driven shaft 27. With the common input drive shaft 27 not rotating, both the forward clutch 28 and the reverse clutch 29 are actuated to frictionally connect the input bevel gears 31 and 36 to the stationary shaft 27, thus braking the gear 32 against rotation. Transmission input shaft 33 drives a selectively shiftable transmission 38 which in turn drives the workpiece spindle 17 at any one of a plurality of speeds. For a more complete description of a drive transmission reference may be had to U.S. Patent 3,259,957 to R. E. Stobbe.

The machine tool illustrated in FIG. 1, is equipped with an automatically operable mechanical workpiece changer 39 which is disposed at the side of the headstock 12 and is operative to interchange the position of the workpiece WP and a new workpiece (not shown) that is stored in a set-up and storage device (not shown). Since the workpiece changer 39 per se is not a part of this invention as such, the precise mechanism for effecting the operation of the workpiece changer in a workpiece interchange cycle of operation has not been shown, nor is it described in detail herein. A more detailed description of the workpiece changer 39 may be had by referring to patent application Ser. No. 641,435 filed May 22, 1967.

At the right end of bed 11, as viewed in FIG. 1, is a supporting structure or column 40 which is constructed with an inclined surface 41. A pair of spaced parallel ways 42 are rigidly secured to the inclined surface 41 and operate to support a cross slide 43 for guided movement therealong, for moving a tool operator 45 relative to the workpiece WP carried by the headstock 12. The slide 43 is moved in either direction by power obtained from a reversible motor 46 secured in operative position at the upper end of the ways 42. A screw 47 is operatively connected to be driven at a selected speed and in either direction by the motor 46. The screw 47 is engaged in well-known manner in a recirculating ball nut structure (not shown) that is secured to the undersurface of the slide 43 for transferring the power drive of the motor to the slide 43.

The tool operator 45 is carried on the cross slide 43 for movement with it. In addition, the tool operator 45 is also supported on the cross slide 43 for pivotal movement relative to the slide about an axis which is disposed perpendicular to the path of travel of the cross slide 43. Pivotal movement of the tool operator 45 serves to move the tool operator 45 from a "first" position, as shown in FIG. 2, wherein a tool 60G carried by the tool operator 45, is disposed so that it extends leftwardly with its axis parallel to the axis of the spindle 17, as depicted in FIGS. 1 and 2, to a "second" position. The "second" position is located counterclockwise 90° from the position depicted in FIG. 2, wherein the tool 60G is disposed so that its axis is parallel to the direction in which the slide 43 is movable and perpendicular to the axis of the spindle 17. The two positions of the tool operator 45 allows a work operation to be performed on the front surface of the workpiece WP, as indicated by general reference number 48, or on the side surface of the workpiece, as indicated by general reference number 49, selectively. A piston-cylinder mechanism, generally identified by reference number 50, is used to position the tool operator 45 in either the "first" or "second" position.

Figure 4:
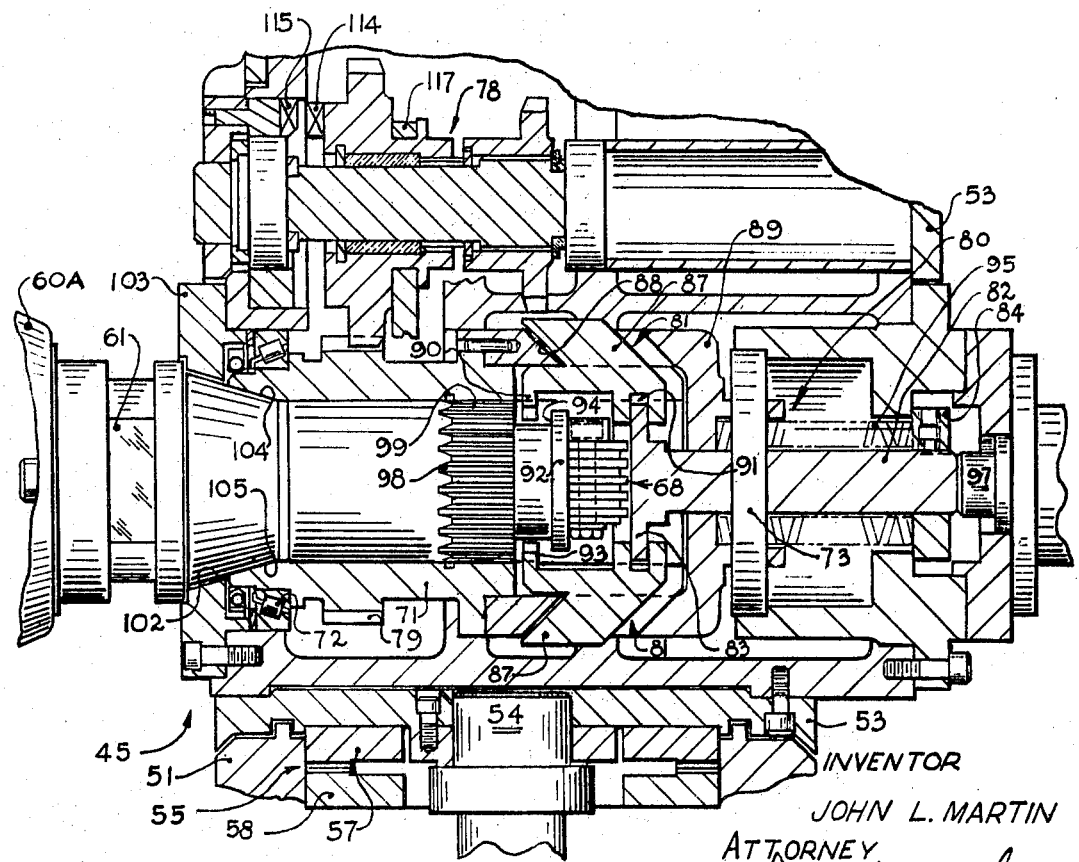
FIG. 4 is a fragmentary view of the tool operator depicted in FIG. 3, with a rotary cutting tool being shown in the spindle and, the major portion of the spindle drive transmission being omitted.

The tool operator 45, shown in FIGS. 3 and 4, has a base 51 which is suitably secured to the slide 43. The base 51 rotatively supports a tool operator housing 53 for precise indexing movement between the "first" position and the "second" position. To this end the housing 53 is provided with a downwardly extending rod 54 and a disengageable gear coupling 55. The gear coupling 55 consists of annular gear rings 57 and 58. Before the tool operator housing 53 can be rotated for positioning the tool operator 45 in either the "first" or "second" position, the housing 53 must be elevated to effect a separation between the clutch teeth of the gear rings 57 and 58. The separation of the gear rings 57 and 58 is effected by a fluid actuator (not shown) that moves the rod 54 in an upwardly direction for disengagement of the tool operator base 51 and the tool operator housing 53. After the tool operator 45 has been rotated to a selected position by the piston cylinder mechanism 50, the housing 53 will be lowered by downward movement of rod 54 to effect a clamping of the tool operator in the selected position.

The machine tool is equipped with an automatically operable mechanical tool changer which is operable to effect an interchange of tools between the tool operator 45 and a tool storage magazine 59. As shown in FIG. 2, a plurality of tools 60, each having a different cutter 60A, 60B, 60C, 60D, 60E and 60F, are stored in the magazine 59. In order to effect a tool interchange between the tool magazine 59 and the tool operator 45, the magazine 59 is indexed to advance a preselected tool to a tool change ready position, as indicated by general reference number 62. A tool transfer arm 63 effects the transfer of a tool from the tool magazine to the tool operator. The tool transfer arm 63 is mounted on and secured to the supporting structure 40 and is supported for rotation about a horizontal axis which is disposed parallel to the axis of the tool 60A in the tool change ready station 62. The tool transfer arm 63 is a hollow housing structure which is provided with a pair of oppositely extensible tool grips 64. The grips 64 are selectively movable from a retracted position within the tool transfer arm housing into fully extended clamped engagement with tools respectively carried by the storage magazine 59 and the tool operator 45. The grips are moved outwardly by a piston-cylinder mechanism 65 which is operatively mounted on the right side of the column 40. With the grips in engagement with the tools in the magazine 59 and the tool operator 45, the arm 63 will be caused to move outwardly to remove the tool from the magazine and simultaneously to remove a previously used tool from the tool operator 45. This movement is effected by a piston-cylinder mechanism 66 which is operatively mounted on the right side of column 40. The arm 63 is then rotated 180° by a piston-cylinder mechanism 67 which is also mounted on the right side of the column 40 to interchange the position of the grips. Then the piston-cylinder mechanism 66 will retract the arm 63 to thereby insert the interchanged tools in the magazine 59 and the tool operator 45. The grips 64 will then be retracted by piston-cylinder mechanism 65 and thereby complete a tool exchange cycle. To insure that the tools, when bodily rotated by the tool transfer arm 63, will not rotate about their axis while in the tool grips, the tools 60 are provided with parallel flat surfaces 61 as shown in FIGS. 4 and 5. The tool grips 64 of the tool transfer arm 63 will grip the parallel flat surfaces 61 of the tool and will transfer the tool from the magazine 59 to a spindle 71 of the tool operator 45. The tools will not turn within the tool grips 64 during the transfer and will always be put in the spindle 71 and in the magazine 59 in the same angular position. For a more complete description of a tool changing device and an associated circuit which will operate in the manner indicated, reference may be had to patent application Ser. No. 181,226, filed Mar. 13, 1962.

Each of the tools 60 is identified by a number and they are each coded in accordance with the binary system to indicate the number of the toolholder. To this end, the axial inner end of each of the tools 60 is provided with ten code segments generally identified by the reference number 68, as shown in FIG. 7, which constitute the coding, with each segment representing one of the digits of the binary numbering system. Some of these segments are longer than others to establish the value of the digit which they represent. The longer segments, as exemplified by the code segment 68A, will represent the numeral 1 for the particular digit of the binary number, while the shorter segments, as exemplified by a code segment 68B, indicate the numeral 0 for that particular digit of the binary system.

Such coding of the tools 60 is read by a tool selector or reading head (not shown). Prior to actuating motor 70 for rotating the magazine 59, the identification number of the desired tool is impressed upon the electrical control system, either manually or automatically in a manner well-known in the art. Then, as the magazine 59 is rotated, the tool reading head (not shown) will read the segments 68 on the axial end of the tools which are stored in the magazine. When the number represented by the code segments 68, read by the reading head (not shown), coincides with the number impressed upon the electrical control system, the electrical control system will operate to position the selected tool in the ready station 62. For a more complete description of a reading head and an associated circuit which will operate in the manner indicated, reference may be had to U.S. Patent Re-reissue 25,737 to W. E. Brainard et al.

The tool operator 45 has a spindle 71 that may be fixed against rotation to accommodate a stationary cutting tool or may be rotated to operate a rotary cutting tool, selectively. To allow the tool operator 45 to utilize a rotary cutting tool, the tool operator 45 has the spindle 71 which is rotatably supported by bearings 72 and 73, as shown in FIG. 3. The spindle 71 is rotatably driven at a selected one of a plurality of speeds obtained from a gear transmission 74. Power to drive the transmission 74 is obtained from a motor 75 which is secured to the tool operator housing 53. Power from the motor 75 is transmitted to the gear transmission 74 via a shiftable gear cluster 76. Power from the transmission 74 is transmitted to an output shiftable gear cluster 77. Shiftable gear cluster 77 in turn, drives spindle drive gear 78 which is in mesh with a gear 79 integrally formed on the spindle 71. Therefore, the power from the motor 75 is transmitted through shiftable gear cluster 76, through gear transmission 74, to shiftable gear cluster 77, to spindle drive gear 78, which, in turn, rotatably drives spindle 71.

Rearwardly of the spindle 71 is a draw-in bar mechanism generally identified by the reference numeral 80, as shown in FIGS. 3, 4 and 7. The draw-in bar mechanism 80 is operable to engage a tool in the spindle 71 and serves to hold the tool in operative position within the spindle. The draw-in bar mechanism 80, in general is comprised of a plurality of radially movable clamp elements 81 and a drawbar 82 which has a flange portion 83 on its left end and a collar 84 secured on its right end. The clamp elements have inclined guides 87 which slidably move within slots 88 cut in a cylindrical guide block 89. The clamp elements also have a groove 91 cut in them in which slidably receives the drawbar flange 83. All tools 60 have a flange 92 located on their rearward end. The arm portion 90 of the clamp elements 81 has a gripping surface 93 which mates with a gripping surface 94 on the tool flange 92. A Belleville spring 95 is mounted around the drawbar 82 and disposed in abutting engagement with the collar 84 and the guide block 89 and operates to bias the drawbar 82 rightwardly as viewed in FIG. 3. The rightward bias applied to the drawbar 82 will engage the flange 83 of the drawbar 82 with the clamp element groove 91 to effect rightward movement of the clamp elements 81, as viewed in FIG. 3, and cause the inclined guides 87 to slide in the guide block slots 88 in a direction toward the center of the spindle 71 and to the right. This movement of the clamp element 81 will effect the engagement of gripping surfaces 93 and 94 of the arm portion 90 and tool flange 92 respectively. The engagement of these two surfaces will exert a force to draw the tool inwardly into the spindle 71. When a stationary cutting tool is drawn into the spindle, its tapered surface 101, as shown in FIG. 3, comes into engagement with tapered surface 102 of the faceplate 103 which is secured to the frame of the tool operator 45. The engagement of the tapered surfaces 101 and 102 fixes the stationary tool in relationship to the frame of the tool operator.

When a rotary cutting tool is drawn into the spindle 71, its tapered surface 104, as shown in FIG. 4, comes into engagement with tapered surface 105 of the spindle 71. The engagement of the tapered surfaces 104 and 105 fix the rotary cutting tool in relationship to the spindle 71. The mating of the stationary tool tapered surface 101 with the tapered surface 102 of the faceplate 103 or the mating of the rotary tool surface 104 with tapered surface 105 respectively, with the engagement of the clamp elements 81 with the tool will positively lock the tool in the spindle 71.

To effect the release of a tool, the drawbar 82 is moved to the left against the force exerted by the Belleville spring 95, as viewed in FIG. 4. The leftward movement of the drawbar 82 is effected by means of an actuating rod 97, slidably supported for axial movement. The actuating rod 97 is moved axially by a hydraulic actuator (not shown)

in a well-known manner. When the hydraulic actuator is energized, the actuating rod 97 will move leftwardly and engage the drawbar 82 and cause it to move to the left against the force applied by the spring 95. The movement of the drawbar 82 will cause the clamp element inclined guides 87 to move in slots 88 in a direction to the left and away from the center of the spindle 71, effecting the separation of the gripping surfaces 93 and 94 to release the tool. The clamp elements 81 thus moving out of engagement with the tool will allow the tool to be withdrawn from the spindle during a tool change cycle of operation.

The turning machine of the present invention provides a tool operator 45 whose spindle 71 is operable to drive a rotary cutting tool in a metal removing operation as depicted in FIG. 7, or to hold a stationary single point turning tool in a predetermined position, as illustrated in FIG. 3, selectively. When it is desired to use a rotary cutting tool in the tool operator spindle 71, a rotary drive connection between the spindle and a rotary cutting tool is established. As shown in FIG. 7, the rearward end of the rotary tool is provided with splines 98 that are adapted to drivingly engage with complementary splines 99 formed internally within the spindle 71. The splines 98 and 99 intermesh to provide a positive driving connection between the tool 60 and the spindle 71 so that as the spindle rotates, the rotary tool will turn with it. A rotary tool is provided with the tapered surface 104 which is of a slightly smaller diameter than the tapered surface 101 of a stationary cutting tool. As a result, when the tool draw-in mechanism 80 pulls the tool into place in the spindle 71, the tapered surface 104 of collar 107 and the tapered surface 102 of the stationary faceplate 103 will have a slight clearance between them. This allows the spindle to rotate freely relative to the faceplate 103.

All of the stationary turning tools, as shown in FIGS. 3 and 6, are provided with a key 110, that is secured to the peripheral surface of the shank of the tool and is adapted to engage in a keyway 111 formed in the stationary faceplate 103 that is disposed in coaxial relationship to the spindle 71. Such engagement of the key 110 in the keyway 111 securely fixes the stationary tools against rotation relative to the tool operator housing 53 to enable the tool to be employed in a turning operation. In view of the presence of the key 110 and keyway 111 each tool, when in storage in the magazine 59 must be angularly orientated so that upon subsequent transfer to the spindle 71, the transfer movement will not only serve to align the tools axially for insertion into the spindle, but will also serve to position the stationary turning tools angularly so that the keys 110 thereon are positioned for engagement in the keyway 111 of the faceplate 103. The reactionary forces of the turning tool machining operation are thus taken by the key and keyway arrangement. Also, since the stationary cutting tools have a slightly larger diameter collar 108 than the rotary tool collar 107, the stationary tool tapered surface 101 will be pulled up by the tool draw-in mechanism 80, to a tight fit with the tapered surface 102 of the stationary faceplate 103. Furthermore, the length of the tapered surface 101 on the stationary tools is much shorter than is the tapered surface 104 on the rotary tools. As a result, the tapered surface 101 on the stationary tools does not reach the tapered surface 105 in the spindle 71. Instead, the cylindrical shank of the stationary tools extends into the area occupied by the tapered surface 105 of the spindle so that clearance is established between the tool and the tapered surface 105.

With the key 110 on the stationary turning tool engaged in the keyway 111 of the stationary faceplate and with the complementary tapered surfaces 101 and 102 in tight engagement, the turning tool will be maintained in an operative predetermined angularly orientated position. In this manner, the cutting portion of the stationary turning tool may be related to a workpiece carried by the rotating workpiece operating spindle 17.

Whenever a tool change is called for, the spindle 71 is always stopped in a predetermined angular position. The spindle 71 is stopped in a predetermined angular position when a stationary turning tool is used so that the key 110 will be engaged in the keyway 111 and the cutter portion of the stationary turning tool will thereby be related to a workpiece carried by the rotating workpiece operating spindle 17. The spindle 71 is also stopped in a predetermined angular position when a rotary tool is used so that the splines 98 on the backward shank of the toolholder will line up with the splines 99 on the inner surface of the spindle 41. Moreover it is desirable to insert rotary cutters in the spindle in the same angular relationship to improve the accuracy of the machining operations. Accordingly, as shown in FIGS. 3 and 4, a key 114 located on the spindle drive gear 78 and a keyway 115 located on a stationary collar 116, which is secured to the tool operator housing 53, are used to effect the positioning of the spindle 71 into a predetermined angularly oriented position. When a tool change cycle is called for, the spindle drive gear 78 is driven in a creep speed and is moved an additional amount axially to the left from the position shown in FIG. 3. The additional axial leftward movement of the drive gear 78 is effected by means of a shifter rod 117, which is moved axially by a hydraulic actuator (not shown) in a well-known manner. The spindle drive gear 78 will turn at a creep speed while the shifting rod 117 is exerting pressure to move the drive gear 78 axially to the left. When the key 114 registers with the keyway 115, the shifting rod completes the leftward movement of the drive gear 78, and the key 114 is moved with the gear 78 into engagement with the keyway 115. Thus, when engagement between the spindle drive gear key 114 and the stationary keyway 115 is effected, the spindle 71 will be positively locked in the desired predetermined angularly orientated position, as the spindle gear 79 is always in mesh with the drive gear 78.

From the foregoing detailed description of the illustrative embodiment set forth herein to exemplify the present invention, it will be apparent that there has been provided an improved machine tool in which the versatility of a turning machine is greatly expanded by including provisions for operating a rotary cutting tool in addition to the conventional stationary cutting tool. As a result, although the machine is capable of performing turning operations in the manner of a conventional lathe, it is also adapted to perform milling as well as other operations that employ a rotary cutter.

Although the illustrative embodiment of the invention has been described in considerable detail for the purpose of disclosing a practical operative structure whereby the invention may be practiced advantageously it is to be understood that the particular apparatus described is intended to be illustrative only and that the novel characteristics of the invention may be incorporated in other structural forms without departing from the spirit and scope of the invention as defined in the subjoined claims.

The principles of this invention having now been fully explained in connection with the foregoing description, I hereby claim as my invention:

1. In a machine tool adapted to perform a variety of machining operations with cutting tools;
   a frame;
   a tool operator carried by said frame;
   a tool spindle journaled in said tool operator adapted to receive either a stationary cutting tool or a rotary cutting tool selectively;
   means for securing a stationary cutting tool in said tool spindle;
   means on said tool operator for fixing against rotation a stationary cutting tool while received in said tool spindle;
   means for securing a rotary cutting tool in said tool spindle;
   means coupling the rotary cutting tool to said tool spindle for rotation in unison therewith;

power means connected to rotate said rotatable cutting tools in said tool spindle; and, means on said frame for supporting a workpiece so that it can be operated upon selectively by either the stationary or rotary cutters in said tool operator.

2. A machine tool according to claim 1 wherein said tool operator includes a housing mounted on said frame and in which said tool spindle is rotatably supported; and, the stationary tools disposed in said spindle are secured to said housing for fixing them against rotation relative to said frame.

3. A machine tool according to claim 1 wherein said workpiece supporting means comprises;

means on said frame for rotatably supporting a workpiece to cooperate with the stationary cutters in said tool spindle;

power means connected to rotate the rotatably supported workpieces; and, means on said frame for fixedly supporting a workpiece for cooperation with the rotary cutters in said tool operator for the performance of a machining operation.

4. A machine tool according to claim 2 including;
a keyway formed in said housing;
a key on each of the stationary tools;
a frustoconical surface on each of the stationary tools; and,
a complementary frustoconical surface formed in said housing, whereby said complementary frustoconical surfaces of said stationary tool and housing will accurately locate the stationary tool relative to the workpiece supported on said frame and said key and keyway will cooperate to fix the stationary tool against rotation relative to said frame.

5. A machine tool according to claim 2 including;
a frustoconical surface on each of the rotary cutting tools;
a complementary frustoconical surface formed in said tool operator spindle;
splines on the rotary tools; and,
complementary splines in said tool operator spindle, whereby said complementary frustoconical surfaces of said rotary tool and said spindle will accurately locate the rotary tool in said spindle and said complementary splines on the rotary tools and said spindle will couple the tool to the spindle for rotation in unison therewith.

6. A machine tool according to claim 1 including;
tool change means operably carried by said frame for removing the previously used tool from said tool spindle and inserting a new rotary or stationary tool into said tool spindle for the performance of a succeeding machining operation.

7. A machine tool according to claim 6 including;
a tool storage magazine carried by said frame for storing a plurality of tools for use in said tool operator spindle; and,
said tool change means transfers the previously used tool from said spindle to said tool storage magazine and extracts a new tool from said magazine and transfers it to said spindle for the performance of a succeeding machining operation.

8. A machine tool according to claim 6 wherein said tool change means is adapted to always introduce a tool into said spindle in a predetermined angular position relative to said spindle; including,
means for stopping said tool spindle in a predetermined angular position upon discontinuation of its rotation.

References Cited
UNITED STATES PATENTS

| | | | |
|---|---|---|---|
| 3,267,550 | 9/1966 | Whittum | 29—27 |
| 3,300,856 | 1/1967 | Daugherty | 29—568 |
| 3,221,404 | 12/1965 | Averill | 29—568 |

FRANCIS S. HUSAR, Primary Examiner

U.S. Cl. X.R.

29—27